United States Patent
Hess

(10) Patent No.: US 10,421,545 B2
(45) Date of Patent: Sep. 24, 2019

(54) VEHICLE DISPLAY

(71) Applicants: BAE Systems Controls Inc., Endicott, NY (US); Robert A. Hess, Newark Valley, NY (US)

(72) Inventor: Robert A. Hess, Newark Valley, NY (US)

(73) Assignee: BAE Systems Controls Inc., Endicott, NY (US)

( * ) Notice: Subject to any disclaimer, the term of this patent is extended or adjusted under 35 U.S.C. 154(b) by 0 days.

(21) Appl. No.: 15/740,450

(22) PCT Filed: Jun. 30, 2016

(86) PCT No.: PCT/US2016/040300
§ 371 (c)(1),
(2) Date: Dec. 28, 2017

(87) PCT Pub. No.: WO2017/004328
PCT Pub. Date: Jan. 5, 2017

(65) Prior Publication Data
US 2018/0186456 A1    Jul. 5, 2018

Related U.S. Application Data

(60) Provisional application No. 62/186,800, filed on Jun. 30, 2015.

(51) Int. Cl.
*B64D 11/00* (2006.01)
*G06F 1/16* (2006.01)
*B64D 11/06* (2006.01)

(52) U.S. Cl.
CPC .... *B64D 11/00152* (2014.12); *B64D 11/0624* (2014.12); *G06F 1/16* (2013.01);
(Continued)

(58) Field of Classification Search
CPC ............... B64D 11/00152; B64D 11/0624
(Continued)

(56) References Cited

U.S. PATENT DOCUMENTS 6,003,052 A * 12/1999 Yamagata ............. G06F 1/1626
345/905
6,977,666 B1    12/2005 Hedrick
(Continued)

FOREIGN PATENT DOCUMENTS

WO    2013034396    3/2013

OTHER PUBLICATIONS

International Search Report, PCT/US2016/040300, dated Sep. 19, 2016, 6 pages.

*Primary Examiner* — Jose V Chen
(74) *Attorney, Agent, or Firm* — Scully Scott Murphy & Presser PC; Scott J. Asmus

(57) ABSTRACT

The present disclosure includes a hardened tablet for use within an aircraft cabin, the hardened tablet including a processor, a touch screen, a memory, a tablet and a protective layer applied to the touch screen of the tablet, the protective layer comprising a bonding material and a laminate. The protective layer of the hardened tablet is selected from the group consisting of a polycarbonate and a chemically strengthened glass. The thickness of the polycarbonate protective layer is between about 0.5 mm and about 1.6 mm. The bonding material is selected from the group consisting of an adhesive tape and an optically clear adhesive. In one embodiment, the protective layer includes a polycarbonate of a thickness of about 0.02" to about 0.04" and the bonding material is an optically clear adhesive.

18 Claims, 9 Drawing Sheets

(52) U.S. Cl.
CPC ....... *B32B 2369/00* (2013.01); *B32B 2405/00* (2013.01); *B64D 11/00155* (2014.12); *Y02T 50/46* (2013.01)

(58) Field of Classification Search
USPC ..................................... 108/44, 45; 297/146
See application file for complete search history.

(56) References Cited

U.S. PATENT DOCUMENTS

| | | | | |
|---|---|---|---|---|
| 7,104,599 | B2* | 9/2006 | Berger | B60N 3/004 108/134 |
| 7,500,716 | B2* | 3/2009 | Guerin | B60N 3/004 297/146 |
| 7,611,198 | B2* | 11/2009 | Schweizer | B60N 3/004 297/217.3 |
| 7,621,593 | B2* | 11/2009 | Dickinson | B60N 3/004 297/146 |
| 8,477,482 | B2* | 7/2013 | Lin | G06F 1/169 361/679.01 |
| 8,826,830 | B2* | 9/2014 | Pajic | A47C 7/70 108/44 |
| 8,934,063 | B2* | 1/2015 | Boyer, Jr. | H04N 5/655 297/144 |
| 8,937,689 | B2* | 1/2015 | Prest | C03C 19/00 345/173 |
| 9,004,590 | B2* | 4/2015 | Westerink | B64D 11/0015 297/217.3 |
| 9,469,400 | B1* | 10/2016 | Irmen | B64D 11/00153 |
| 9,663,041 | B2* | 5/2017 | Dueser | B60R 11/0235 |
| 9,701,409 | B2* | 7/2017 | Valdes | B64D 11/0015 |
| 9,815,555 | B2* | 11/2017 | Riedel | B64D 11/00155 |
| 2002/0175567 | A1* | 11/2002 | Marin-Martinod | B64D 11/0015 307/29 |
| 2003/0047598 | A1* | 3/2003 | Stahi | G07F 9/00 235/380 |
| 2005/0132407 | A1* | 6/2005 | Boyer, Jr. | H04N 7/17318 725/77 |
| 2005/0206206 | A1* | 9/2005 | Peng | B60R 11/0235 297/217.3 |
| 2006/0075934 | A1* | 4/2006 | Ram | B60N 3/004 108/44 |
| 2008/0251201 | A1 | 10/2008 | Sikkel et al. | |
| 2009/0174847 | A1* | 7/2009 | Kuno | B60R 11/0235 349/96 |
| 2010/0162327 | A1* | 6/2010 | Bonar | B64D 11/0015 725/77 |
| 2011/0019123 | A1 | 1/2011 | Prest et al. | |
| 2011/0095577 | A1* | 4/2011 | Kennard | G09F 7/18 297/146 |
| 2011/0174926 | A1* | 7/2011 | Margis | B60N 3/004 244/118.6 |
| 2012/0174165 | A1 | 7/2012 | Mondragon et al. | |
| 2012/0250250 | A1 | 10/2012 | Tatebe | |
| 2013/0017380 | A1* | 1/2013 | Murata | C03B 25/08 428/215 |
| 2013/0295366 | A1* | 11/2013 | Murata | C03C 3/093 428/220 |
| 2014/0150233 | A1* | 6/2014 | Hussain | F16M 11/22 29/428 |
| 2014/0167457 | A1* | 6/2014 | Schultheis | B64D 11/06 297/162 |
| 2014/0289306 | A1 | 9/2014 | O'Sullivan et al. | |
| 2014/0300578 | A1 | 10/2014 | Hotelling | |
| 2015/0004390 | A1* | 1/2015 | Kawamoto | C03C 4/18 428/220 |
| 2015/0034687 | A1* | 2/2015 | Terleski | B64D 11/0015 224/275 |
| 2015/0120097 | A1 | 4/2015 | Hathaway | |
| 2015/0329406 | A1* | 11/2015 | Kawamoto | C03C 3/091 428/34.1 |
| 2015/0336673 | A1* | 11/2015 | Hommel | B60R 11/0235 297/217.3 |
| 2016/0004899 | A1* | 1/2016 | Pi | G06F 1/1626 345/173 |
| 2016/0167339 | A1* | 6/2016 | Dollase | C08L 25/10 428/522 |
| 2016/0176356 | A1* | 6/2016 | Krikorian | B60R 11/02 224/275 |
| 2016/0200949 | A1* | 7/2016 | Lee | G06F 3/0412 174/251 |
| 2016/0207825 | A1* | 7/2016 | Black | C03C 21/002 |
| 2016/0249073 | A1* | 8/2016 | Margis | H04N 21/2146 |
| 2016/0264244 | A1* | 9/2016 | Matsumoto | F16M 1/00 |
| 2016/0297526 | A1* | 10/2016 | Everhart | B64D 11/00151 |
| 2016/0356932 | A1* | 12/2016 | Carlucci | G02B 5/223 |
| 2017/0205541 | A1* | 7/2017 | Amin | G02B 1/18 |
| 2017/0251086 | A1* | 8/2017 | Gagne-Keats | G06F 1/1626 |
| 2017/0270343 | A1* | 9/2017 | Lai | G06K 9/00053 |
| 2017/0355464 | A1* | 12/2017 | Perng | B64D 11/0624 |
| 2018/0314096 | A1* | 11/2018 | Yang | G02F 1/13338 |

\* cited by examiner

VEHICLE DISPLAY

BACKGROUND

Various embodiments of the present system relate to use of tablet and similar type computers coupled to vehicle seats or mounted onto vehicle structures (e.g., for use as aircraft inflight entertainment displays).

Conventionally, aircraft inflight entertainment systems use various display technologies to provide audio, video and related content to passengers. The displays may be mounted to aircraft cabin structure (e.g., walls, ceilings, etc.), or mounted to aircraft seats.

Each display is typically directly wired to some form of power (e.g., 15 VDC, 28 VDC, 115 VAC, etc.). The actual signal/content to be displayed is received via a video signal (in one example, it may be an analog signal, such as: analog RGB, S-video, etc.; in another example, it may be a digital signal such as: Ethernet, HDMI, DVI, etc.). Either copper-based wiring or fiber-optic cabling is typically required to go to each display.

The displays must also be designed to limit passenger exposure to hazards (e.g., debris, sharp edges, etc.) in the event the display sustains impact damage (e.g., accidental head impact, etc.).

Federal Aviation Administration (FAA) Advisory Circular (AC) 25-17A includes requirements for display protection related to head impact and delethalization. Certain head impact criteria (HIC) must be met by equipment fitted to aircraft seats, with the requirements directed to the injuries a human head would expect to receive in the event of a head strike during an impact. The criteria defines both the total energy to be absorbed by the installed equipment (display) as well as the requirement of limit any exposure to sharp edges, debris, etc. Resulting from head impact (delethalization). These requirements are further clarified in FAA AC 25.562-1B, which also provides testing procedures for this determination.

This testing required by the FAA states that a display fitted to a seat must absorb an impact by a 13 pound mass, impacting the display with an energy of 2,780 inch pounds. This energy is designed to be the equivalent to the head of a 170 pound person striking the display during a 9 g crash. This amount of energy is well in excess of that experienced by typical displays during normal, personal use. The FAA requires that upon such an impact, the display does not have fragments or pieces dislodge from the unit and create hazards.

Design of conventional cabin displays to utilize wired connections as well as the required hardening of such displays increases their cost.

In addition, the nature of the conventional mounting for such displays typically limits the ability of a passenger to hold the display in his or her hands (thus reducing ease of use).

SUMMARY

The present disclosure includes a hardened tablet for use within an aircraft cabin, the hardened tablet including a processor, a touch screen, a memory, a tablet and a protective layer applied to the touch screen of the tablet, the protective layer comprising a bonding material and a laminate. The protective layer of the hardened tablet is selected from the group consisting of a polycarbonate and a chemically strengthened glass. The thickness in one example of the polycarbonate protective layer is between about 0.5 mm and about 1.6 mm. The bonding material in one embodiment is selected from the group consisting of an adhesive tape and an optically clear adhesive. In one embodiment, the protective layer includes a polycarbonate of a thickness of about 0.02" to about 0.04" and the bonding material is an optically clear adhesive.

BRIEF DESCRIPTION OF THE DRAWINGS

The drawings are provided for illustrative purpose only and do not necessarily represent practical examples of the present invention to scale. In the figures, the same reference signs are used to denote the same or like parts.

DETAILED DESCRIPTION

In the discussion and claims herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat.

Figure 1:
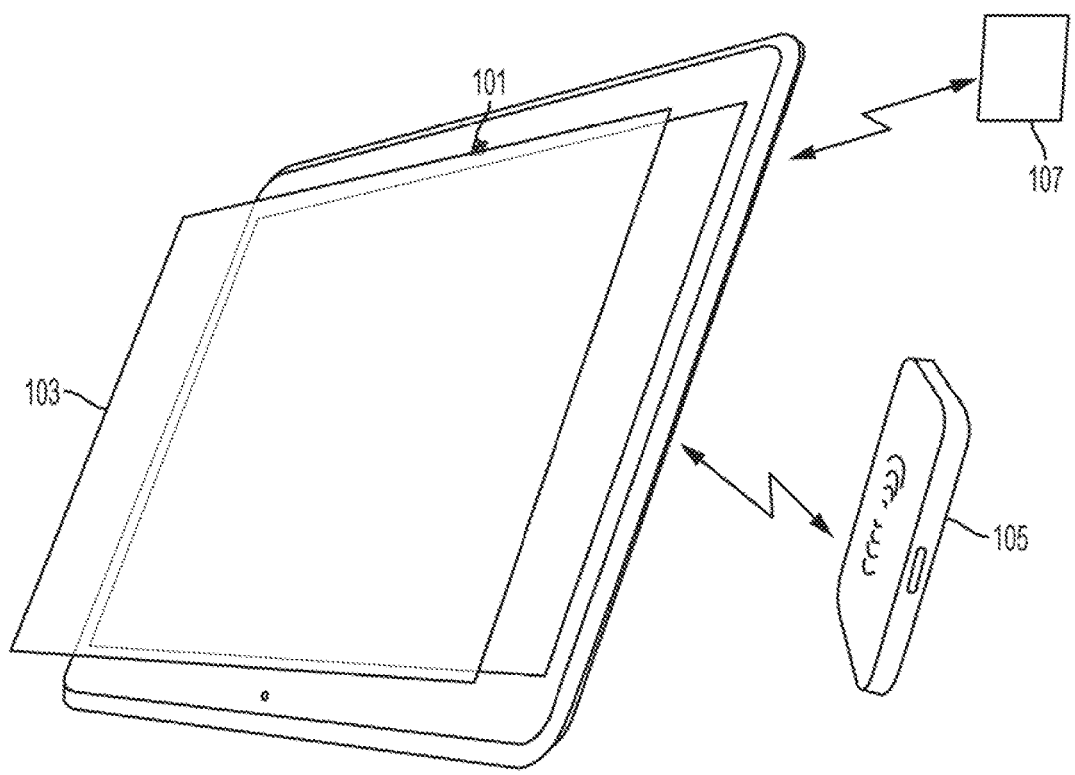
FIG. 1 is a diagram of a system including a hardened, wireless tablet (incorporating wireless charging, wireless communications, and a protective layer over the display surface) according to an embodiment of the present invention.

Referring now to FIG. 1 is a diagram of a system including a hardened, wireless tablet (incorporating wireless charging, wireless communications, and a protective layer over the display surface) according to an embodiment of the present system. As used herein, the term tablet refers to Portable Electronic Devices (PEDs), including tablet computers and computing devices having a visual output or screen on one side of a substantially flat or planar casing, inside of which, the computing device (i.e. all computing components) is substantially contained. One example of a tablet is an iPad® offered for sale by Apple®.

As seen, in this embodiment the system includes hardened tablet 101. Hardened tablet 101 incorporates a protective layer 103 (e.g., transparent protective layer) on the screen of the tablet, a wireless charging receiver (not shown) for receiving power from wireless charging transmitter 105, and a wireless transceiver (not shown) for enabling bi-directional wireless communication capability (for example, WiFi/WiGig) with wireless access point 107. The hardened tablet 101 can be embedded in an object, semi-embedded in the object and can be wired or wireless for receiving and transmitting power, etc. The hardened tablet 101 can be of any appropriate size and may utilize passive display technology or any appropriate touch-screen technologies (e.g., resistive, capacitive, etc.). The hardened tablet 101 incorporates the circuitry to support wireless charging. This can include use of inductive charging (e.g., Qi charging), or any other contactless charging solution. The hardened tablet 101 contains circuitry to support wireless data communications, such as WiFi (IEEE 802.11a/b/g/n/ac), WiGig (IEEE 802.11ad), Bluetooth, etc.

In one example, the protective layer 103 consists of a transparent laminate bonded (e.g., glued) to the screen of the tablet (i.e., the existing display face). In this example, the protective layer 103 is designed to retain any debris/fragments from coming off the display surface in the event of impact (e.g., impact of a passenger body part (such as head) with the tablet). The protective layer 103 is also designed to allow proper function of the touch screen of the hardened tablet 101. The thickness of the protective layer 103, including the laminate and any bonding material affects functionality, visual display as well as the overall size and weight of the hardened tablet 101. The choice of material to form the protective layer 103 also impacts the weight of the protective layer 103, with a lighter weight being preferable for use in vehicles.

The protective layer 103 is referred to herein as "transparent", which is meant to include transparent materials, substantially transparent materials and any material that allows for a sufficient amount of light to pass from the display, through the protective layer, to a user. In other embodiments the protective layer 103 can be translucent or substantially translucent and still allow for a sufficient amount of light to pass from the display, through the protective layer, to a user. Also, the protective layer 103, including the laminate and any bonding material, cannot be above a level of flammability defined in Radio Technical Commission for Aeronautics (RTCA) DO 160G, section 26 and FAA AC 33.17-1.

Figure 2:
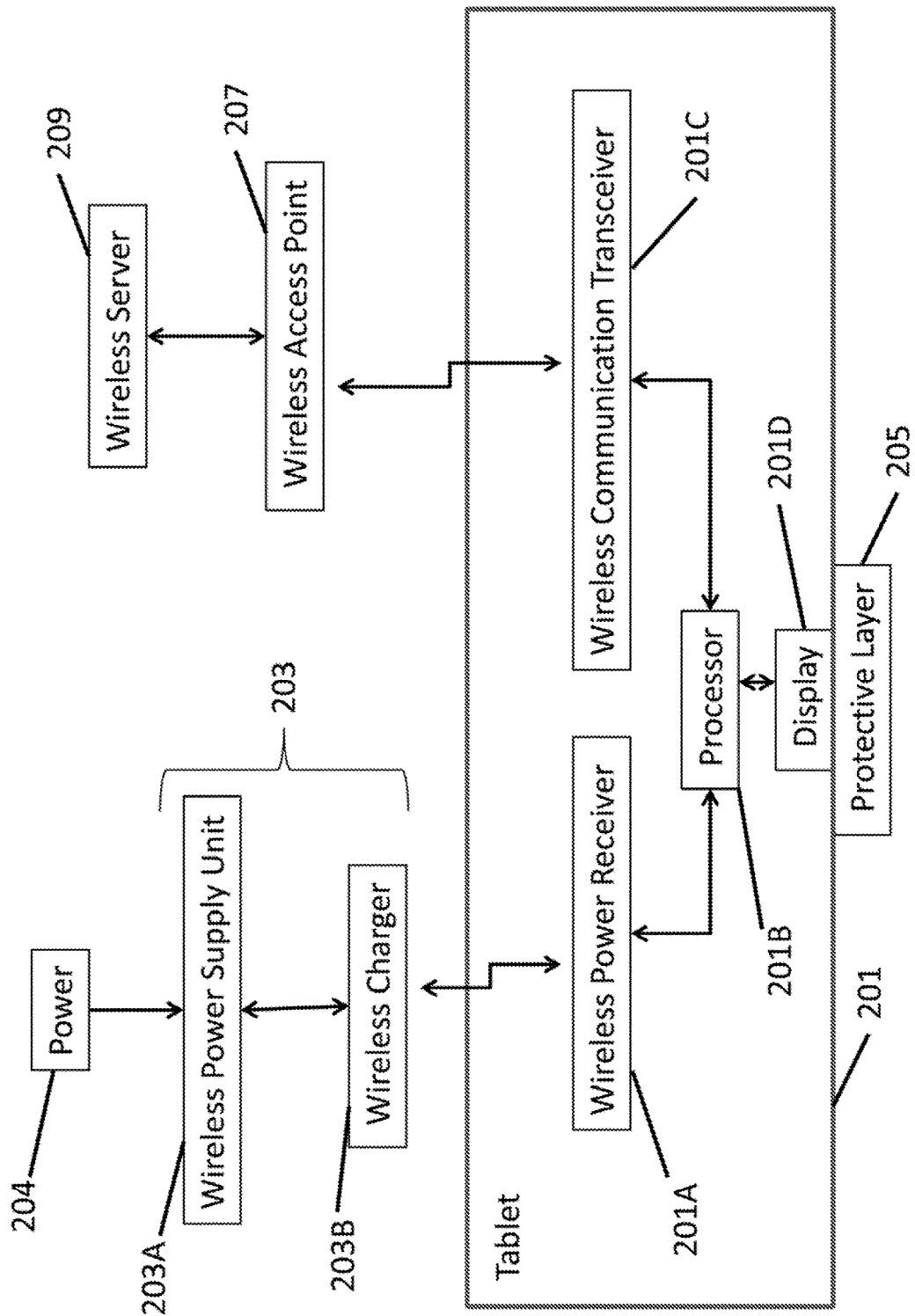
FIG. 2 is a block diagram of a system showing a relationship between a wireless power delivery system, a wireless communication system, and a hardened tablet according to an embodiment of the present invention.

Referring now to FIG. 2 is a block diagram of a system showing a relationship between a wireless power delivery system, a wireless communication system, and a hardened tablet according to an embodiment of the present invention. As seen, in this embodiment the hardened tablet 201 is used in conjunction with a wireless charging system 203. This wireless charging system 203 receives vehicle power 204 and creates an AC signal in power supply 203A. The power supply 203A may be mounted, for example, in a vehicle structure, including a vehicle seat (such as an aircraft seat or a train seat). In one specific example, a plurality of wireless power supplies may be fitted to the vehicle (e.g., a power supply in each of a plurality of seats) to deliver a charge of electricity to the hardened tablet 201. The power supply 203A is connected to wireless charger 203B (in another example, a single power supply may feed a plurality of wireless chargers). The power supply 203A may also be used to produce other forms of power, such as, for example, 110 VAC, 60 Hz power, 5 VDC USB power, etc. to support passenger needs.

Still referring to FIG. 2, as mentioned, the power supply 203A is connected to wireless charger 203B. The wireless charger 203B receives the AC signal from the power supply 203A and creates an electromagnetic field (using a wireless charger transmitter, not shown). The wireless power receiver 201A of hardened tablet 201 converts the electromagnetic field to electricity for use by the tablet electronics. The power is used to operate the tablet processor 201B, wireless communication transceiver 201C, and display 201D. The collected power (that is, the power received from wireless charger 203B) can also be stored in a battery (not shown) within the tablet, thereby allowing the tablet to operate when power is not available or when a user elects to remove the tablet (for example, from the seatback as described herein) for ease of use. Further, as seen, mounted to display 201D (such as by being bonded via gluing or the like) is protective layer 205.

The wireless charger 203B can, for example, be embedded into vehicle structure or seat(s). This eliminates the need for exposing power connections. As exposed power connections are typically a source of failure (e.g., misused or broken connectors) and are a potential shock hazard, the use of wireless charging improves reliability and simplifies the power supply electronics (e.g., allows removal of ground fault circuit protection and plug presence detection circuitry) as compared with certain conventional in-seat power solutions.

The hardened tablet 201 is able to communicate wirelessly within the vehicle. In one example, a plurality of tablets can communicate wirelessly with a wireless access point 207. One or more wireless access points can be connected to a wireless server 209, thereby allowing content to be served to the tablets while allowing data to be collected from the tablets.

Figure 3:
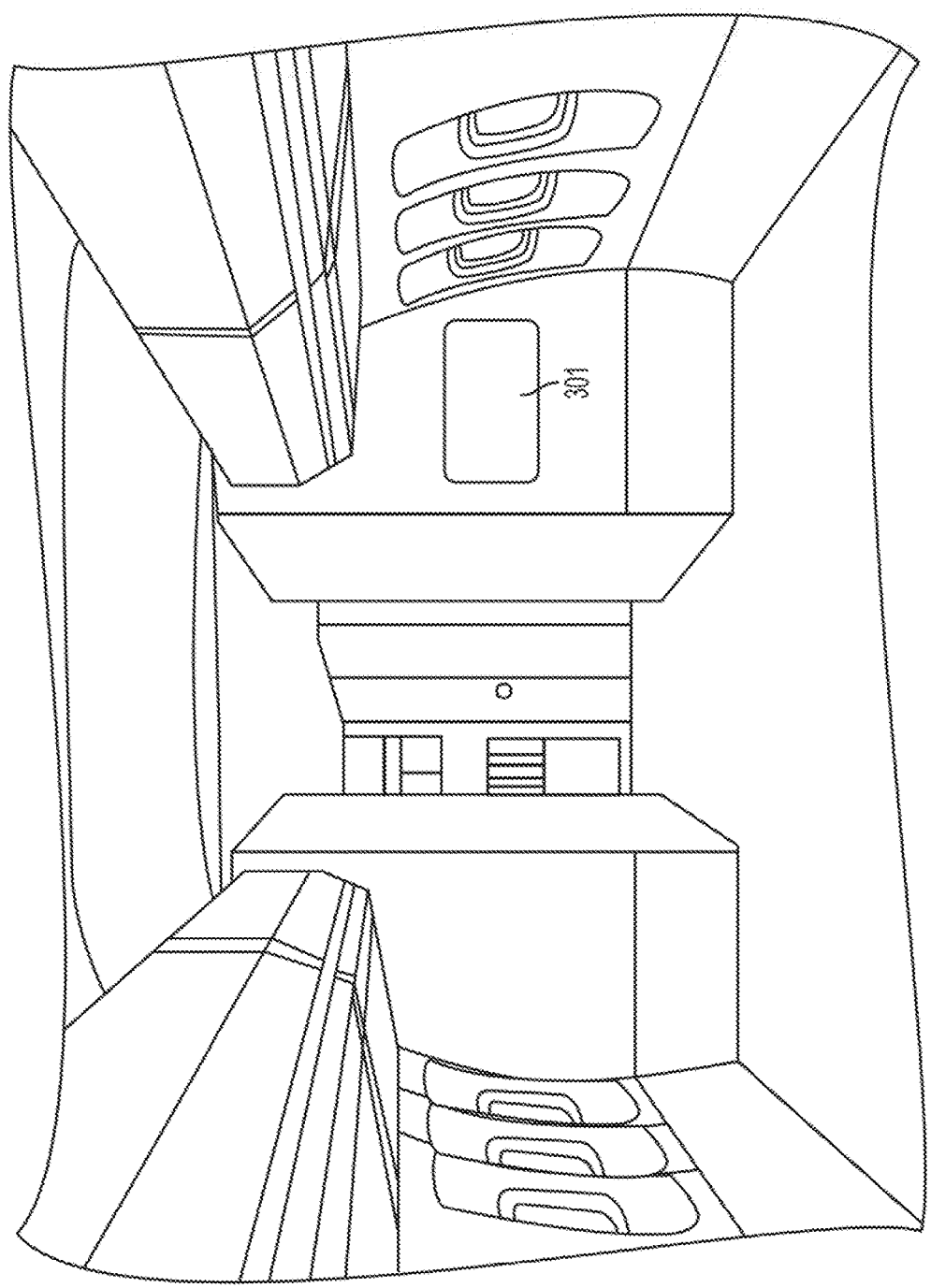
FIG. 3 depicts an example installation of a hardened, wireless tablet according to an embodiment of the present invention as mounted to (e.g., embedded in) a vehicle structure.

Referring now to FIG. 3 is a diagram of an example installation of a hardened, wireless tablet 301 mounted or otherwise coupled to a vehicle structure (in this example, an aircraft partition). A wireless charger (not shown) is, in this example, disposed behind the hardened tablet 301 to provide functionality as described herein.

Figure 4:
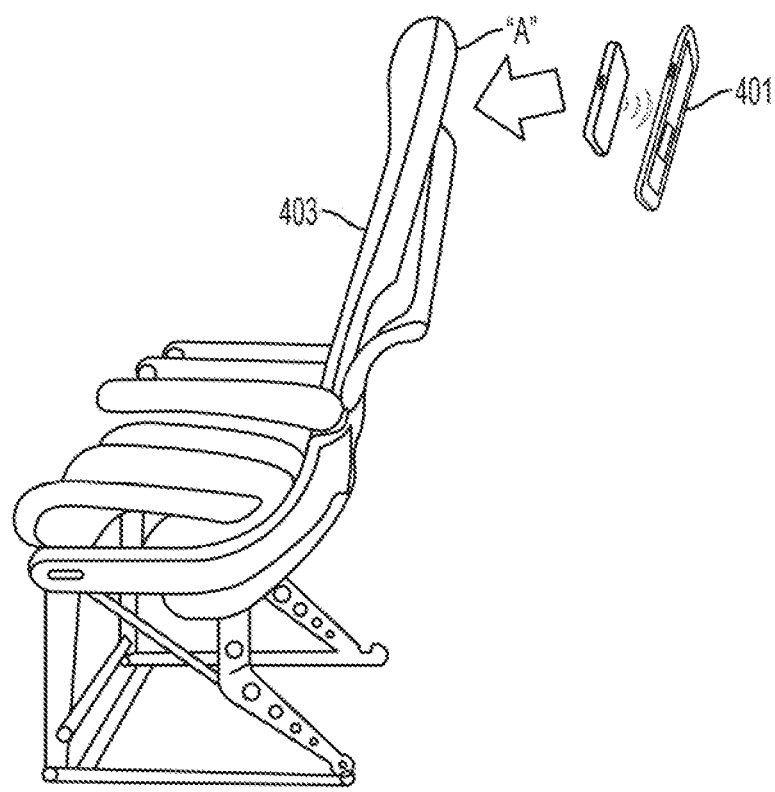
FIG. 4 depicts an example installation of a hardened, wireless tablet according to an embodiment of the present invention (wherein the tablet is configured to be mounted to (e.g., embedded in) a seat back).

Referring now to FIG. 4 is a diagram of an example installation of a hardened, wireless tablet 401 configured to be mounted or otherwise coupled to a seatback (in this example, a seatback of an aircraft seat 403). A wireless charger (not shown) is, in this example, disposed in the seatback at location "A" (behind the hardened tablet 401 when the hardened tablet 401 is placed into the seatback) to provide functionality as described herein.

The hardened tablet as described herein may be mounted or coupled to vehicle structure (or vehicle seat(s)) using attachment mechanisms which allow the hardened tablet to be easily removed and replaced (e.g., for ease of use by a seated passenger who wishes to remove the tablet from the seatback to hold in his or her hands). Such attachment mechanisms may be in the form of clips which hold the edges of the tablet, rails which the tablet may slide within, small cleats, surface-to-surface mating material (e.g., Velcro, etc.) or a combination thereof. In one example, the attachment mechanism should place the tablet over the embedded wireless charger, provide minimal air gap with respect to the wireless charger, and be designed of sufficient strength to stop the tablet from dislodging in the event of a hard landing, turbulence, crash, etc. In another example, the attachment mechanism includes an electrical plug that directly mates with the power connection of the hardened tablet 401.

In one example, the tablets described herein may be provided in connection with an inflight entertainment system (IFE). In one specific example, the tablets described herein may facilitate the production of a low-cost IFE.

In one example, the protective layer may be glued on (or otherwise suitable bonded) to the tablet display screen.

In another example, any form of tablet (or panel computer) may be used as described herein (e.g., in aircraft, including equipment control and electronic flight bags).

In another example, the protective layer: (a) supports (that is, permits) resistive touch functionality; (b) supports (that is, permits) capacitive touch functionality; (c) is substantially transparent (that is, "see through"); (d) is relatively light weight; and/or (e) meets applicable head impact criteria (e.g., related to not releasing debris/fragments).

In one specific example, the protective layer meets the applicable NHTSA (National Highway Traffic Safety Administration) standards (e.g., head impact criteria (HIC) tests).

In another specific example, the hardening (e.g., protective layer) may be designed to contain debris/fragments (but not necessarily to protect the display screen from scratches).

In another specific example, the hardening (e.g., protective layer) may be designed to contain debris/fragments (but not necessarily to render the tablet operable after the impact).

In another specific example, the hardening (e.g., protective layer) described herein can be used for cabin control panel applications.

As described herein, various embodiments provide for a mechanism to offer a robust tablet-based IFE solution for both airline "hand-out" and embedded solutions.

As described herein, various embodiments can simplify airline logistics and increase security (e.g., by eliminating charging cables/ports that create logistic issues for airlines and that present both maintenance and security issues).

As described herein, various embodiments can simplify installation and reduce cost and weight.

As described herein, various embodiments can provide for "bring your own device" (BYOD) charging.

As described herein, various embodiments can provide a higher bandwidth for wireless communication as compared to certain conventional systems. For example, delivery of Gigabit performance to each seat at significantly lower system/installation cost. In one specific example, the WiGig standard may be utilized to increase bandwidth (e.g., via use of 60 GHz spectrum, beam forming, etc.). In another example, true high-definition (HD) streaming in cabin can be provided.

In another example, a case may be provided for the tablet such that a protective layer as described herein covers the display screen of the tablet and such that the case permits the wireless capabilities (e.g., wireless network communication; wireless charging) described herein.

In one example, the protective layer may be a laminate (e.g., having one or more sheets).

In another example, the protective layer may comprise a laminate of chemically strengthened glass (e.g., GORILLA GLASS of varying sizes (available from CORNING)). In this example the chemically strengthened glass can have a thickness of about 1.1 mm to about 1.6 mm.

In another example, the protective layer may comprise a laminate of PETG plastic (polyethylene terephthalate). This is also sometimes referred to as PET, PETE or PETG. In another example, the protective layer may comprise a polycarbonate or a lexan. In these two examples the thickness of the laminate can be about 0.5 mm to about 1.6 mm.

In another example, sheets of the laminate may be bonded together using: adhesive tape; and an optically-clear adhesive (OCA).

In another example, the protective layer may be bonded to the tablet screen using: adhesive tape; and an optically-clear adhesive (OCA).

In another example, the OCA may be UV curable OCA-DUPONT DBA2220 UV curable liquid acrylic adhesive. In one specific example of use of this adhesive, the bonding thickness may be about 0.5 mm.

In another example, the OCA may be 3M-9583 optically clear acrylic adhesive. In one specific example of the use of this adhesive, the bonding thickness may be about 0.127 mm.

In another example, the adhesive tape may be 3M-VHB adhesive. In one specific example of the use of this adhesive, the bonding thickness may be about 0.381 mm.

In another example, the hardened tablet can include a protective layer of a polycarbonate with a thickness of about 0.5 mm to about 1.6 mm applied to the touch screen of the tablet by an OCA, with the proviso that the protective layer is not chemically strengthened glass and an adhesive tape is not applied to the protective layer.

The methods and apparatus of the present disclosure will be better understood by reference to the following Examples, which are provided as exemplary of the disclosure and not by way of limitation.

Example 1

An example of testing different laminates and bonding materials that can be included as a protective layer 103 of a hardened tablet 101 are described herein. A number of laminates were tested, including polycarbonate of differing thicknesses of 0.02", 0.04" and 1.6 mm and chemically strengthened glass of differing thicknesses of 1.1 mm and 1.6 mm.

Along with different laminates tested, different bonding materials and methods were tested.

The first bonding material was an adhesive tape, which includes a two surface tape (3M™-VHB™ adhesive) applied only around the edge of the laminate and the edge of the tablet. This adhesive tape maintains a small gap of air between the laminate and the tablet surface.

The second bonding material was an optically clear adhesive (OCA)(3M™-9583 optically clear acrylic adhesive), which was applied to the whole surface of the tablet, to which the laminate material is applied. After the laminate material was applied, the assembly was placed in a fixture and a vacuum was applied to remove any air trapped between the laminate material and the tablet.

The third bonding material was a liquid optically clear adhesive (OCA)(DuPont™ DBA2220 UV curable liquid acrylic adhesive), which was applied to the surface of the tablet in a serpentine pattern. The laminate was then applied, with capillary action moving the air to the edges and bonding with the OCA without a vacuum fixture applied.

Testing was then performed to determine the ability of the different laminates and the different bonding materials to meet the HIC delethalization requirements, the results of which are shown in Table A below:

TABLE A

| Sample | Material | Average Stackup Thickness (material and bonding) (inch) | Bonding Method | Results of HIC test |
|---|---|---|---|---|
| 1 | 0.040" HC Polycarb, laminated | 0.22 | OCA | Pass |
| 2 | 1.1 mm Chem Str. Glass | 0.56 | UV curable OCA | Not tested - glass expected to fail |
| 3 | 1.1 mm Chem Str. Glass | 0.36 | Adhesive Tape | Not tested - glass and edge adhesive tape expected to fail |
| 4 | 0.020" HC Polycarb, undersized lens | 0.13 | OCA | Pass |
| 5 | 1.6 mm Chem Str. Glass | 0.36 | Adhesive Tape | Not tested - glass and edge adhesive tape expected to fail |
| 6 | 0.040" HC Polycarb, laminated | 0.23 | OCA | Pass |
| 7 | 1.6 mm HC Polycarbonate | 0.65 | UV curable OCA | Not tested - no touch sensitivity |
| 8 | 1.6 mm HC Polycarbonate | 0.33 | Adhesive Tape | Adhesive Tape failed around 66% of edge. Polycarbonate intact - fail |
| 9 | 1.6 mm Chem Str. Glass | Not determined | UV curable OCA | Bonding worked well. Debris formed at impact point - fail |

Other qualities of the protective layer 103 were assessed for the different laminates and the different bonding materials, the results of which are shown in Table B below:

TABLE B

| Property | 0.020" polycarbonate (UV curable OCA) | 0.020" polycarbonate (OCA) | 0.040" polycarbonate (UV curable OCA) | 0.040" polycarbonate (UV curable OCA) | 0.5 mm polycarbonate (UV curable OCA) | 0.5 mm polycarbonate (UV curable OCA) |
|---|---|---|---|---|---|---|
| Thickness | Very Good | Very Good | Good | Good | Poor | Poor |
| Weight | Very Good | Very Good | Good | Good | Poor | Poor |
| Radio Operations | Good | Good | Good | Good | Good | Good |
| Touch Sensitivity | Very Good | Very Good | Good | Good | Poor | Poor |
| Flammability | Good | Good | Good | Good | Good | Good |
| Ease of Application | Good | Poor | Good | Poor | Good | Poor |

Each column of Table B includes a combination of laminate and bonding material.

As can be seen from the Tables above, polycarbonate of 0.020" and 0.040" thickness bonded with OCA passed the HIC delethalization test, but in other embodiments, other materials and bonding materials could also pass the HIC delethalization test. The testing procedure of the various combinations of laminates and bonding materials is described below.

Although some combinations of protective layer and bonding material did not pass the HIC delethalization test, hardened tablets including those combinations of protective layer and bonding material could be used in other applications not requiring a FAA standard for head impact. For example, the combinations of protective layer and bonding material did not pass the HIC delethalization test could be used in a different part of an airplane other than the back of a seat, in an automobile, for personal use to protect the touch screen from scratches, etc.

Example 2

There are two criteria to determine whether the hardened tablets of Table A passed the HIC delethalization test as set out in AC 25-17a, the first being a hazard criteria, with the second being an energy criteria. Under the hazard criteria the hardened tablets of Table A were each inspected to determine if sharp edges were created or debris was created. To pass the hazard criteria, no parts can become loose or sharp projections can be formed, with local deformation acceptable.

Under the energy criteria, a HIC value of less than 1,000 units is acceptable according to the following formula:

$$HIC = \left[ (t_2 - t_1) \left[ \frac{1}{(t_2 - t_1)} \int_{t_1}^{t_2} a(t)dt \right]^{2.5} \right]_{max}$$

According to this formula $t_1$ is the initial integration time, $t_2$ is the final integration time, and $a(t)$ is the total acceleration vs. time-curve for the head strike, with t being in seconds and (a) being in units of gravity.

Figure 5:
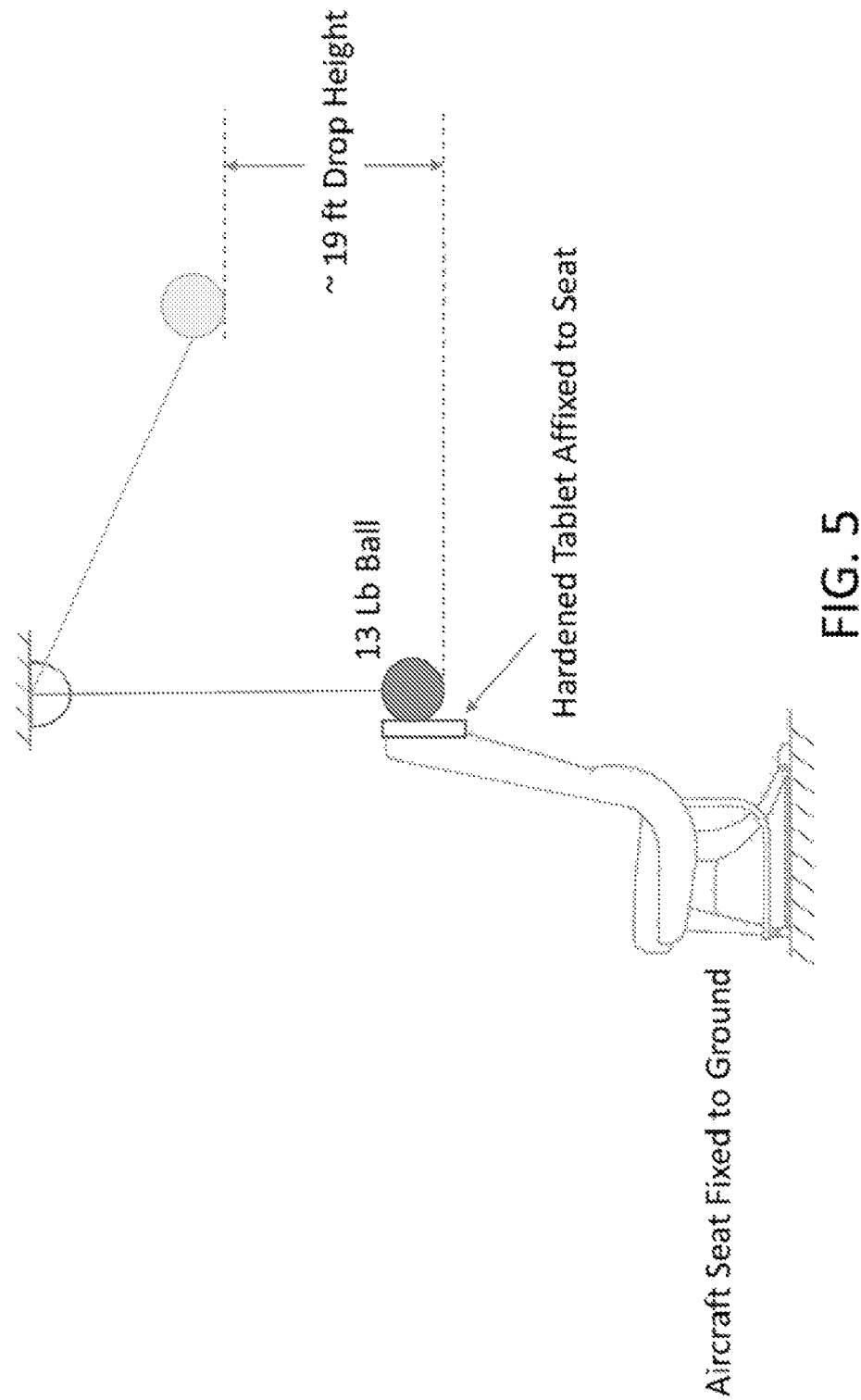
FIG. 5 is an illustration of the ball drop apparatus used to conduct the tests discussed below.

To test the hardened tablets of Table A and determine their HIC energy value, a bowling ball test apparatus was constructed, as shown in FIG. 5. The bowling ball impact test was selected for testing of the hardened tablets of Table A because it is suitable for determining head impact levels according to the FAA Civil Aeromedical Institute.

As seen in FIG. 5, the test material (which is a hardened tablet) was placed in the back of a seat at a distance from the bowling ball, such as to simulate a 35-inch head strike arc. The bowling ball was 13 pounds, which simulates the head of a 170 pound person whose seat belt is fastened and is subjected to 9 g of deceleration force, such as during a hard impact. The test structure of FIG. 5 is designed so that the bowling ball impacts the hardened tablet with at least 2,780-inch-pounds of energy.

The drop height was determined as follows, the bowling ball of 13 pounds (57.82 Newtons), energy of 2,780-inch-pounds of energy (314.1 Joules). Energy=force*distance, therefore distance (drop height)=energy/force=314.1/57.82=about 5.43 meters vertically, which results in about a 19 foot drop along an arc.

In FIG. 5 the end of the cable holding the bowling ball was suspended from the ceiling vertically above the hardened tablet and seat so the ball would swing along an arc, in a pendulum action, and impact the hardened tablet and seat with the drop height of about 5.43 vertical meters (~19 feet along an arc).

The testing procedure described above and the data associated therewith below is a measurement of the impact force realized by the bowling ball exerted by a combination of both the hardened tablet and the seat the hardened tablet was mounted in.

Several test results of hardened tablets of Table A will now be discussed. These results are derived from testing hardened tablets with the apparatus of FIG. 5, discussed above.

Figure 6:
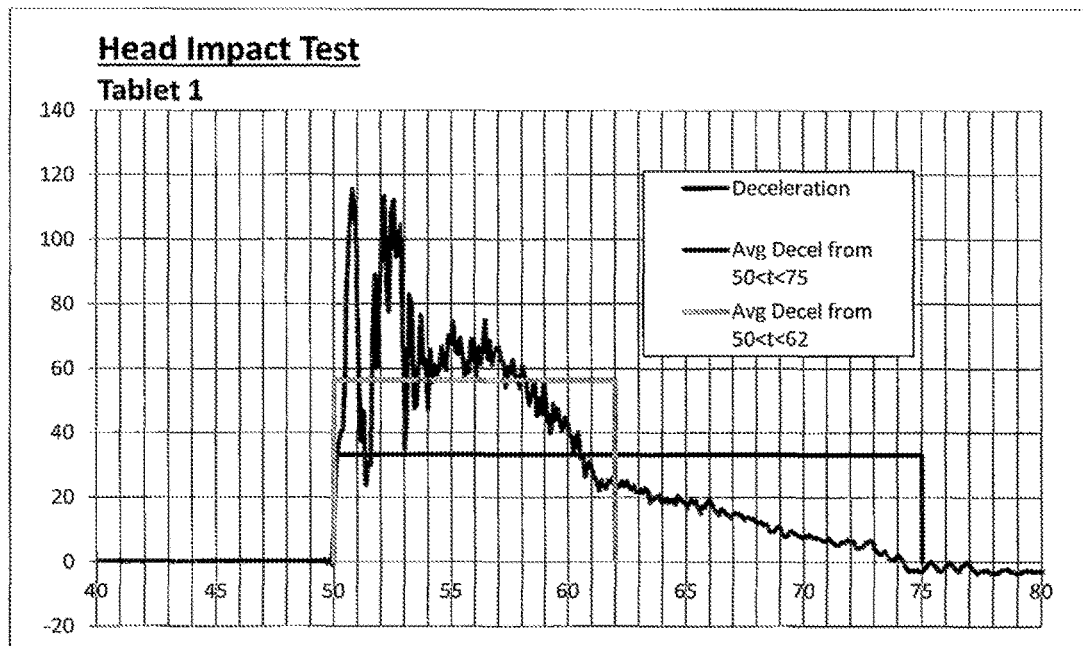
FIG. 6 is a graphical representation of deceleration forces of a first embodiment of a tested, hardened tablet.

For hardened tablet #1 of Table A, the HIC using a maximum of 36 ms time duration (50 ms to 86 ms) was 85.51, the HIC using full duration of the impact pulse (50 ms to 75 ms) was 158.78 and the HIC using the major portion of the impact pulse (50 ms to 62 ms) was 287.18. These results are shown in FIG. 6.

Figure 7:
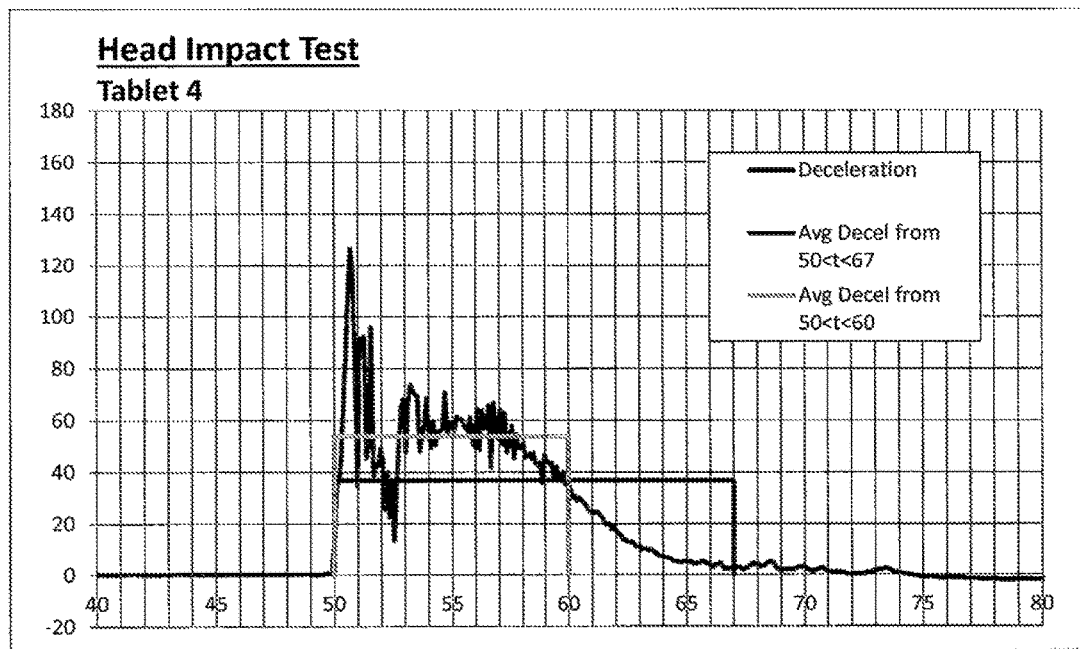
FIG. 7 is a graphical representation of deceleration forces of a second embodiment of a tested, hardened tablet.

For hardened tablet #4 of Table A, the HIC using a maximum of 36 ms time duration (50 ms to 86 ms) was 45.81, the HIC using full duration of the impact pulse (50 ms to 75 ms) was 139.53 and the HIC using the major portion of the impact pulse (50 ms to 62 ms) was 213.27. These results are shown in FIG. 7.

Figure 8:
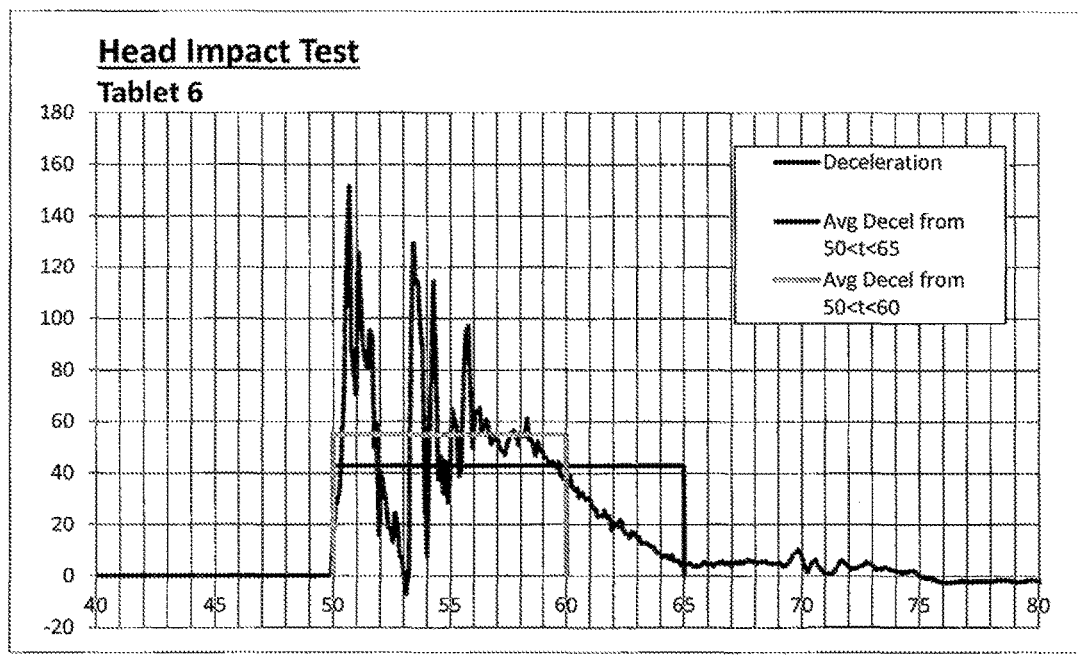
FIG. 8 is a graphical representation of deceleration forces of a third embodiment of a tested, hardened tablet.

For hardened tablet #6 of Table A, the HIC using a maximum of 36 ms time duration (50 ms to 86 ms) was 53.94, the HIC using full duration of the impact pulse (50 ms to 75 ms) was 181.70 and the HIC using the major portion of the impact pulse (50 ms to 62 ms) was 225.63. These results are shown in FIG. 8.

Figure 9:
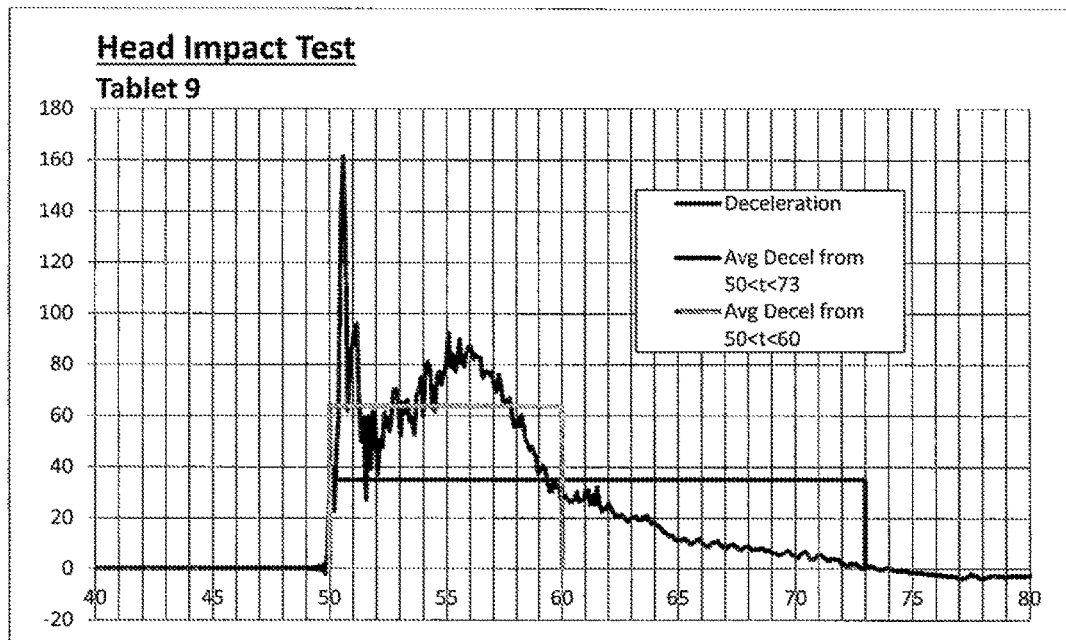
FIG. 9 is a graphical representation of deceleration forces of a fourth embodiment of a tested, hardened tablet.

For hardened tablet #9 of Table A, the HIC using a maximum of 36 ms time duration (50 ms to 86 ms) was 79.14, the HIC using full duration of the impact pulse (50 ms to 75 ms) was 167.32 and the HIC using the major portion of the impact pulse (50 ms to 62 ms) was 325.46. These results are shown in FIG. 9.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

What is claimed is:

1. A hardened tablet for use as an entertainment system within an aircraft cabin, the hardened tablet comprising:
   a tablet comprising:
      a processor;
      a touch screen;
      a memory;
      a wireless transceiver; and
   a protective layer bonded to the touch screen of the tablet, the protective layer comprising a bonding material and a laminate,
   wherein the hardened tablet is mounted to a seatback of an aircraft.

2. The hardened tablet of claim 1, wherein the protective layer is a polycarbonate.

3. The hardened tablet of claim 1, wherein the protective layer is a chemically strengthened glass.

4. The hardened tablet of claim 2, wherein a thickness of the polycarbonate is between about 0.5 mm and about 1.6 mm.

5. The hardened tablet of claim 1, wherein the bonding material is an adhesive tape.

6. The hardened tablet of claim 5, wherein the adhesive tape is a two surface 3M™-VHB™ adhesive tape.

7. The hardened tablet of claim 1, wherein the bonding material is an optically clear adhesive.

8. The hardened tablet of claim 7, wherein the optically clear adhesive is selected from the group consisting of 3M™-9583 optically clear acrylic adhesive and DuPont™ DBA2220 UV curable liquid acrylic adhesive.

9. The hardened tablet of claim 1, wherein the protective layer comprises a polycarbonate of a thickness of about 0.02" to about 0.04" and the bonding material is an optically clear adhesive.

10. The hardened tablet of claim 1, wherein the hardened tablet has a head impact criteria (HIC) value of less than 1,000 according to the HIC delethalization test as set out in Federal Aviation Administration Advisory Circular 25-17a.

11. The hardened tablet of claim 1, wherein the aircraft is configured to charge the hardened tablet.

12. The hardened tablet of claim 1, further comprising a mount on the seatback for securing the hardened tablet, wherein the hardened tablet can be removed from the mount during use of the hardened tablet.

13. The hardened tablet of claim 12, wherein the mount is configured to charge the hardened tablet.

14. The hardened tablet of claim 13, further comprising a wireless charger on the mount and a wireless charging receiver on the hardened tablet.

15. The hardened tablet of claim 1, wherein the hardened tablet comprises computing components and is a Portable Electronic Device.

16. The hardened tablet of claim 1, wherein the hardened tablet is an iPad® offered for sale by Apple®.

17. The hardened tablet of claim 1, wherein the protective layer is configured to meet one or more National Highway Traffic Safety Administration (NHTSA) head impact criteria (HIC) tests.

18. The hardened tablet of claim 1, wherein the protective layer is configured to contain debris and/or fragments upon an impact.

\* \* \* \* \*